Jan. 26, 1932.  J. M. SPARKS  1,842,633
MOTOR VEHICLE MECHANISM
Filed March 14, 1928  2 Sheets-Sheet 1
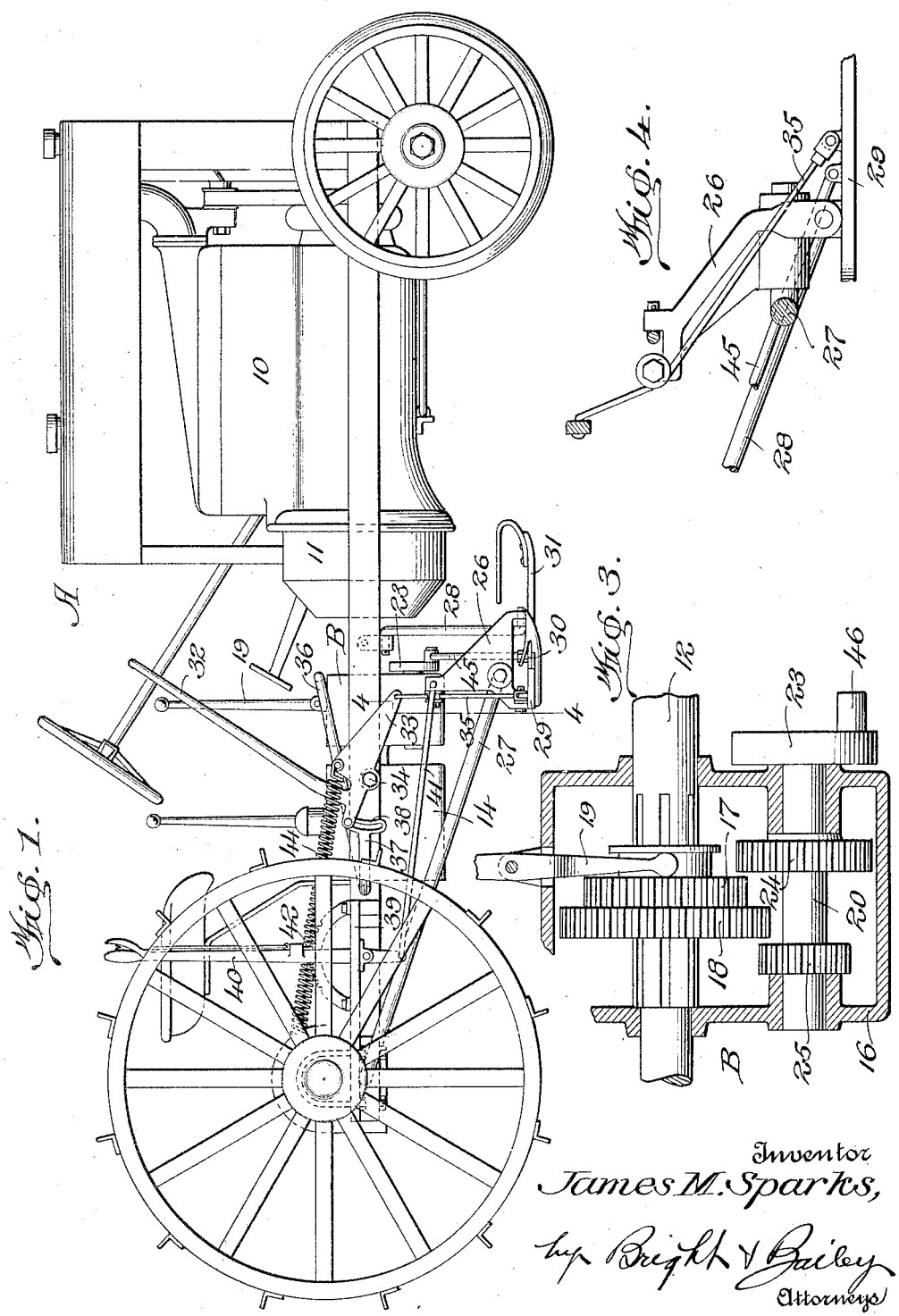
Inventor
James M. Sparks,
by Bright & Bailey
Attorneys Jan. 26, 1932.  J. M. SPARKS  1,842,633
MOTOR VEHICLE MECHANISM
Filed March 14, 1928  2 Sheets-Sheet 2
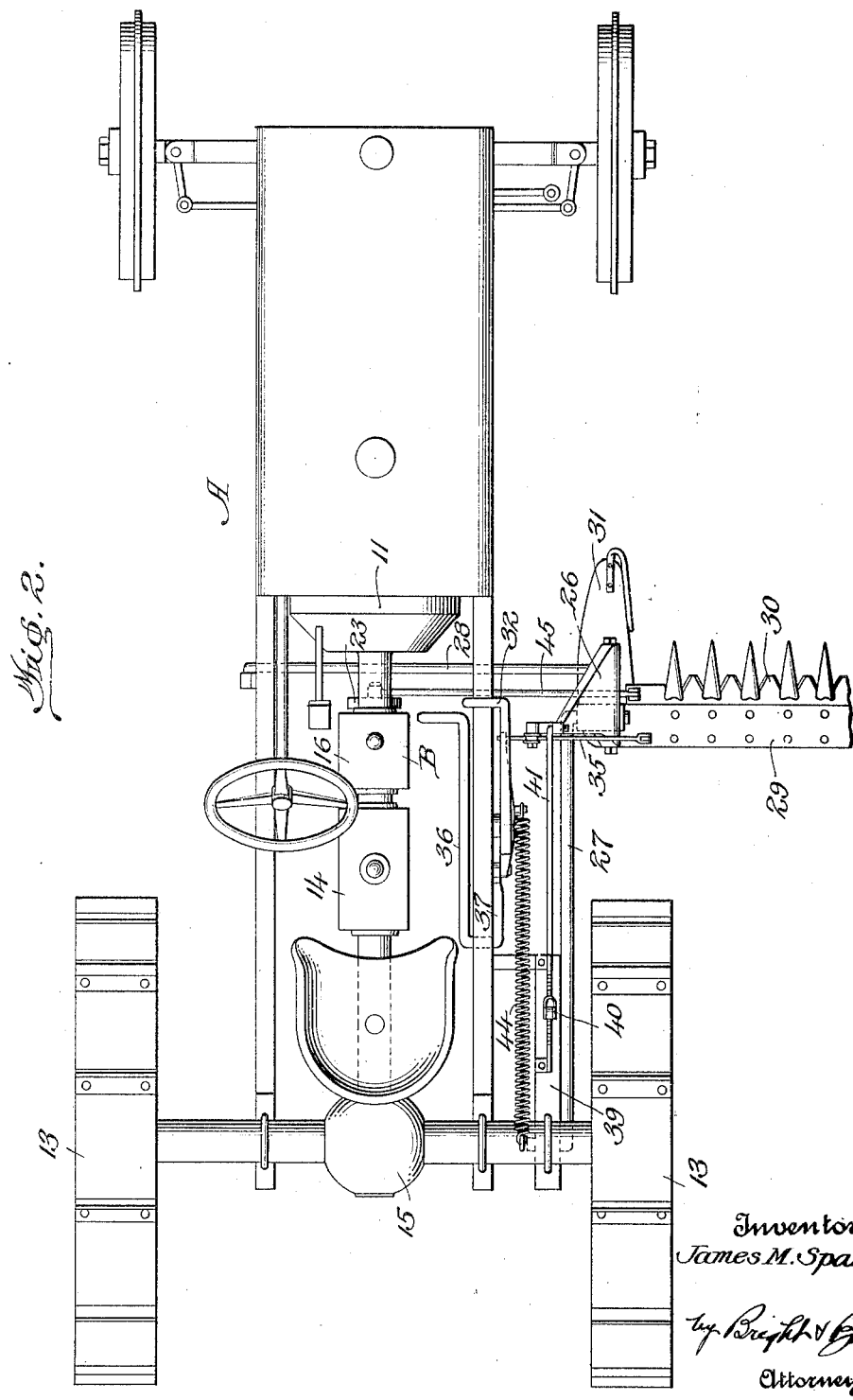
Inventor
James M. Sparks
by Bright & Bailey
Attorneys Patented Jan. 26, 1932

1,842,633

UNITED STATES PATENT OFFICE

JAMES MONROE SPARKS, OF GRAND JUNCTION, COLORADO, ASSIGNOR OF ONE-THIRD TO JOHN WADDA THOMPSON, OF GRAND JUNCTION, COLORADO

MOTOR VEHICLE MECHANISM

Application filed March 14, 1928. Serial No. 261,663.

My invention relates to motor vehicle mechanisms and particularly to a type in which the power plant propelling the vehicle also is utilized to operate other machinery travelling with the vehicle.

The primary purpose of my invention is to incorporate into a motor vehicle a power distributing mechanism in association with the power plant of the vehicle, which will permit operation of machinery travelling with the vehicle and at the same time enable such operation to be controlled independently of the travel of the vehicle, so that it is possible to vary the operative speed of such machinery with respect to the rate of vehicle travel and, if desired, operate the machinery at variable speeds while the vehicle is at rest.

My invention is particularly advantageous in operating a mowing machine of the reciprocating cutter type in association with a motor tractor and it will be disclosed in detail by such application, but it will be understood that other type of machinery may be operated and controlled in an advantageous manner through the instrumentality of my improved motor vehicle mechanism.

In the drawings chosen to illustrate my invention, the scope whereof is set forth in the appended claim:—

Figure 1 is a side elevation of a motor vehicle showing my power distributing mechanism incorporated therein;

Figure 2, a top plan view;

Figure 3, a sectional view through the supplemental transmission gear mechanism employed with my invention; and Figure 4, a section on the line 4—4 of Fig. 1.

With particular reference to the drawings A indicates generally a motor tractor of conventional design including a suitable motor 10 whose crank shaft is connectable by a clutch, shown typically at 11, to drive shaft 12. The rotation of this drive shaft is transmitted either directly or in variable ratio or in reverse relation, to the traction wheels 13 of the tractor through the medium of a variable speed transmission 14, and a differential gearing mechanism 15 as is usual.

To distribute power from the motor 10 to other machinery and have such distribution under the convenient control of the operator of the tractor I locate between the variable speed transmission 14 and the clutch 11 a second variable speed transmission indicated generally at B. This latter transmission comprises a casing 16 through which the drive shaft 12 extends. Slidably keyed to the shaft 12 within the casing 16 are clustered gears 17 and 18, the former being of less diameter than the latter, a gear shift lever 19 being operatively connected with said gears for sliding them along said shaft for a purpose that will presently appear. Journaled in the casing 16 beneath and parallel to the shaft 12 is a jack shaft 20 one end of which projects beyond the forward end of said casing 16 and has fixed thereon a crank wheel or disk 23 to which the machinery to be operated, in this instance a reciprocating cutter of a mowing machine, is adapted to be connected. Fixed on the shaft 20 within the casing 16 are spaced gears 24 and 25 the former of which has a greater diameter than the latter. The relative relation between the gears on the shaft 12 and the gears on the shaft 22' is such that when the gears 17 and 18 are moved a predetermined distance in one direction on the shaft 12, the gears 17 and 24 will be brought into mesh, while movement of said gears 17 and 18 a predetermined distance in the opposite direction will mesh gears 18 and 25. It will thus be apparent that when the gears 17 and 24 are in mesh the shaft 20 will be rotated at less speed than would be produced when the gears 18 and 25 are in mesh. Owing to the spacement of the gears 24 and 25 it will be obvious that the gears 17 and 18 can be moved to a position where none of the gears will mesh, in which neutral relation of the gears the shaft 20 will remain idle while the shaft 12 rotates.

I have shown a mowing machine of the reciprocating cutter type associated with the tractor A and having the rapidity or speed of its operation controlled by the transmission B, irrespective of the rate of travel of the tractor, and also irrespective of whether the tractor is moving or at rest. The mowing machine illustrated comprises a shoe hinge plate 26 which has connection with the tractor through coupling bar 27 and a transverse coupling brace 28. The cutter bar and cutter are shown in fragment and are indicated respectively at 29 and 30. The bar 29 carries the usual inner shoe 31 which is hinged to the plate 26 whereby said bar and cutter may be swung upwardly when not in use or for other purposes. The bar 29 is adapted to be swung upwardly by a hand lever 32 which is secured to a cutter bar lifting sector 33 pivotally mounted on a stud bolt 34 carried by the tractor. The lifting sector 33 has its forward end connected to the cutter bar 29 by a flexible connection 35, whereby rearward movement of the lever 32 will rotate the sector 33 in a counter-clockwise direction and raise the free end of the cutter bar as will be obvious. In order to slightly elevate the free end of the cutter bar to permit the latter to pass over obstructions in the path of the cutter, I provide a foot operated lever 36 the inner end of which pivots in the chassis of the tractor and is then returned forwardly in a short extension 37, said extension being connected to the inner end of the sector 33 by a link 38. By this construction it will be apparent that if the operator presses down on the free end of the lever 36 with his foot the sector 33 will be rotated to elevate the free end of the cutter bar 29 a sufficient distance to permit the same and its associated cutter to pass over such obstructions as are usually encountered in the operation of mowing. In order to tilt the cutter bar 29 and its associated cutter 30 on an axis transverse the line of travel of the cutter bar and cutter I provide a bracket 39 carried by the rear axle of the tractor and to this bracket I pivot a hand lever 40. The lower end of this lever extends beneath the bracket 39 a short distance and is connected by a link 41 to the upper end of the plate 26. The lever 40 is adapted to be held in any desired position to which it may be pivoted by means of a pawl 42 carried thereby and cooperating with a toothed sector mounted on the bracket 39. To yieldingly resist movement of the cutter bar and cutter from elevated to lowered positions I provide a spring 44 one end of which is secured to the rear axle of the tractor and the other end to the sector 33. Operative connection between shaft 20 and cutter 30, whereby the latter is reciprocated by rotation of said shaft, is provided by a pitman 45 one end of which is pivotally connected to the inner end of the cutter 30 and the other end thereof journaled in a crank pin 46 carried by the crank wheel 23.

It is well known that the most efficient operation of a standard traction operated reciprocating mowing machine necessitates a travel speed of the machine of three to four miles an hour. If the travel speed is too high, even though the scantiness of the crop being cut would warrant such higher speed to attain the most effective mowing results, the cutter will separate or brake under the severe jerking imposed thereon by too rapid reciprocation. With my invention as disclosed I am enabled to increase the travel speed of the mowing machine without increasing the reciprocating speed of the cutter and to also attain other advantages over traction operated mowing machines. I accomplish such advantages by relatively gearing the transmissions 14 and B, differential 15 and drive wheels of the tractor so that the following results are obtained. (a) When the transmissions 14 and B are both in low gear, the pitman crank wheel 23 will have the same number of revolutions for a given distance of travel of the tractor as the pitman crank wheel of a standard mower in the same distance of travel. The same result is obtained when both of the transmissions 14 and B are in high gear. (b) If mowing over rough ground, it may be desirable to slow down the travel of the tractor and at the same time maintain the crank wheel 23 in high speed and this is accomplished by placing transmission 14 in low gear and transmission B in high gear, such arrangement and relation precluding any choking of the sickle or cutter. (c) If mowing over smooth ground with a light crop, it may be desirable to speed up the travel of the tractor and still maintain a low pitman speed which is accomplished by placing the transmission 14 in high gear and the transmission B in low gear which obtains a mowing efficiency under the conditions specified which cannot be obtained with the ordinary standard traction mowing machine of the reciprocating type. (d) The operation of the cutter 30 may be maintained while turning corners and while the tractor is at rest, which status is desired at times.

I claim:

The combination with a motor vehicle including a motor, drive shaft and differential gearing, of a reciprocating mowing machine carried by the vehicle comprising a shoe plate, longitudinal and transverse coupling bars attached to said vehicle and supporting said plate at one side of the vehicle, a cutter bar pivoted to said plate, a reciprocating cutter in said bar, a sector plate pivotally supported by the vehicle and extending on opposite sides of its pivot, a foot lever having a pin and slot connection with one end of said plate, said lever being operable to impart limited rotary movement to the sector plate, a flexible connection between the other end of said plate and cutter bar, a hand lever formed integral with the sector plate for pivoting said plate to position the cutter bar in full inoperative position, a variable speed transmission connecting the drive shaft and differential gear of the vehicle whereby the speed and direction of travel of said vehicle may be controlled, a casing between said transmission and motor through which said drive shaft extends, a jack shaft journaled in said casing and having one end projecting exteriorly of the casing, connections between the projecting end of said jack shaft and the cutter whereby rotation of the jack shaft will reciprocate the cutter, and a variable speed transmission connecting the drive shaft and the jack shaft, said transmission being geared to rotate the jack shaft at variable speeds within a range essential to the proper operation of a standard reciprocating mowing machine.

In testimony whereof I hereunto affix my signature.

JAMES MONROE SPARKS.